United States Patent

[15] 3,683,546

Congdon

[45] Aug. 15, 1972

[54] CONTROL SYSTEM FOR REMOTELY CONTROLLED MODEL CAR

[72] Inventor: John M. Congdon, Seattle, Wash.

[73] Assignee: Jerobee Industries, Inc., Redmond, Wash.

[22] Filed: Nov. 1, 1971

[21] Appl. No.: 194,241

[52] U.S. Cl. ............................................46/244 B
[51] Int. Cl. ............................................A63h 33/26
[58] Field of Search..................46/45, 210, 244 B, 46/243LV; 180/46

[56] References Cited

UNITED STATES PATENTS

| | | | |
|---|---|---|---|
| 3,014,311 | 12/1961 | Ernst | 46/244 |
| 3,239,962 | 3/1966 | Toteff et al. | 46/244 |
| 3,344,553 | 10/1967 | Taggart | 46/45 |
| 3,553,886 | 1/1971 | Hamilton | 46/210 |

FOREIGN PATENTS OR APPLICATIONS 1,074,468    1/1960    Germany

*Primary Examiner*—Robert Peshock
*Assistant Examiner*—Robert F. Cutting
*Attorney*—John O. Graybeal et al.

[57] ABSTRACT

A model automobile or boat having a steering mechanism and a motor with a throttle control. A single remotely controlled servomechanism operatively connected to both the steering mechanism and the motor throttle control. The servomechanism has a conventional straight-arm connection to the steering mechanism. In its intermediate position, the servomechanism holds the steering apparatus in a straight ahead position, and it is movable in a first direction to turn the car to the right, and movable in a second direction to turn the car to the left. The same servo unit is connected to the throttle control mechanism through a linkage which functions in a manner that with the servomechanism in its intermediate position, the throttle is at a high setting whereby the motor is turning at a higher speed to cause the vehicle to travel faster. Movement of the servomechanism in either the first or second direction causes a movement of the throttle control linkage to move the throttle to a lower speed setting. Thus, if the car is turned in either a right or left direction, the motor throttle is moved to a lower setting, while the throttle is at a higher setting with the car traveling straight ahead.

19 Claims, 19 Drawing Figures

Patented Aug. 15, 1972

JON M. CONGDON
INVENTOR.

BY *Graybeal, Cole & Barnard*

ATTORNEYS

Patented Aug. 15, 1972

INVENTOR.
JON M. CONGDON
BY Graybeal, Cole & Barnard
ATTORNEYS

Patented Aug. 15, 1972
3,683,546
3 Sheets-Sheet 3
FIG. 14
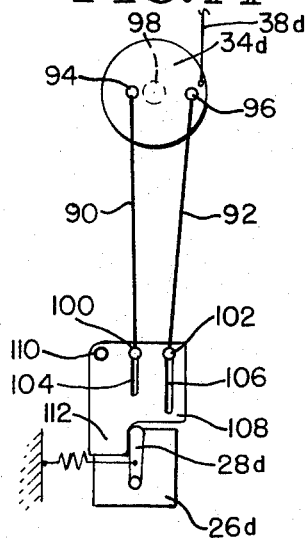
FIG. 15
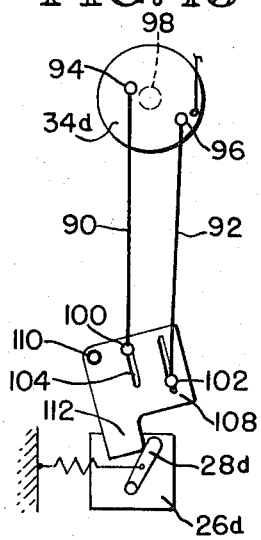
FIG. 16
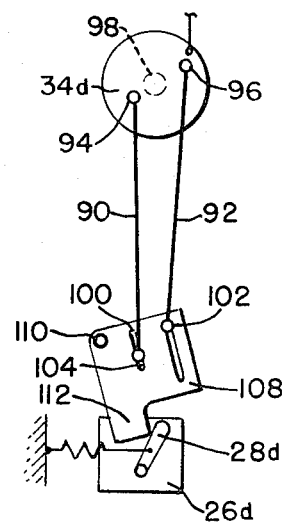
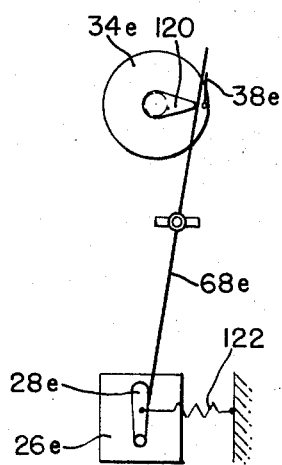
FIG. 17
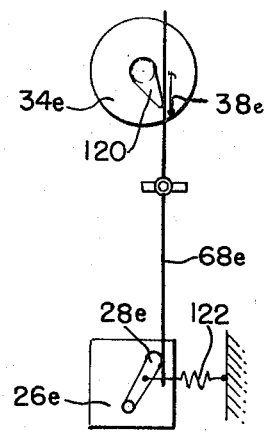
FIG. 18
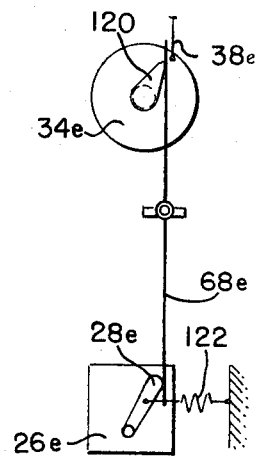
FIG. 19
INVENTOR.
JON M. CONGDON
BY
ATTORNEYS

CONTROL SYSTEM FOR REMOTELY CONTROLLED MODEL CAR

BACKGROUND OF THE INVENTION

1. Field of the Invention

This invention relates generally to the field of remotely controlled power driven vehicles, such as model cars or boats, and more particularly to a control apparatus for the same.

Description of the Prior Art

Generally in prior art remotely controlled power driven vehicles, there is a first remotely controlled servomechanism to control the steering apparatus of the car, and a second similar servomechanism to control the throttle setting to make the car go faster or slower. This mode of operation is shown in Hamilton, U.S. Pat. No. 3,553,886, and in Huffman, U.S. Pat. No. 3,355,838.

Other prior art patents disclose a source of compressed air to control the steering of the vehicle, and other means to control the speed of the motor to drive the car, as in Bunting, U.S. Pat. No. 2,688,821 and Okuma, U.S. Pat. No. 3,555,726. Dingee et al., U.S. Pat. No. 2,993,299, shows a method of controlling both the steering and the motor throttle from an alternating current by directing the positive half cycle portions of the current to the motor control and negative portions of the current to the steering solenoid, and employing separate control means for the two current portions. Sommerhoff, U.S. Pat. No. 2,742,735, shows a method of steering a model automobile by actuating a motor reverse mechanism which causes a gear to engage a steering quadrant to cause the car wheels to turn for that short increment of time that the motor is in reverse, the drive transmission being free wheeling so that the temporary reverse condition does not skid the vehicle.

Other examples of the prior art are McRoskey, U.S. Pat. No. 2,687,595; Saito, U.S. Pat. No. 3,029,371; Hornbostel, U.S. Pat. No. 3,280,501; and Hanmer, U.S. Pat. No. 3,474,565.

SUMMARY OF THE INVENTION

In the present invention there is in the vehicle, such as a model car or boat, a single servo device operable by a command input, such as a remotely initiated radio signal. This servo device is connected to the steering apparatus of the car through a conventional steering linkage. Thus the servo device has an intermediate position in which the steering apparatus is positioned for straight ahead travel, and movement of the servo mechanism in one direction causes the steering mechanism to move to the right, while movement of the servo device in a second direction causes it to move to the left.

This same servo device is connected to a throttle control (i.e., speed control) of the vehicle by means of a linkage which functions in a manner that while it receives a bi-directional input from the servo device, it transmits a uni-directional output to the throttle to move the throttle to its lower speed position. That is to say, when the servo device moves to either the first or second direction to steer the vehicle to, respectively, the right or the left, the linkage moves the throttle to a lower setting to slow the car down, regardless of which direction the car is turning. Thus by means of a single servo device, when the car is going into a turn, the car is caused to travel at a reduced speed to prevent spinout or overturning of the car.

In a first embodiment, the throttle control linkage is an elbow linkage comprising a resilient arm having a root end by which it is connected to the servo device and an outer end connected to the motor throttle. The arm has an intermediate "elbow portion" about which the arm is able to bend. There is a stationary abutment located on one side of the arm at a location between its intermediate elbow portion and its outer end. Movement of the servo device in one direction moves the arm away from the abutment in straight arm fashion to move the throttle to its lower setting. Movement of the servo device in the opposite direction bends the arm against the abutment so as to bend the arm at the elbow portion and cause the outer end of the arm to again move in the direction to move the throttle to its lower setting.

In a second embodiment there is an elbow linkage which, instead of having a bendable elbow joint as in the first embodiment, has a pivotal elbow joint at a location near the root end of the linkage arm. Otherwise the mode of operation is generally the same as in the first embodiment. The arm rotates about the pivot point in only one direction, so that when the entire arm moves in one direction the arm remains stiff, while in the opposite direction of movement, the arm bends about this pivot point as the outer arm portion engages a stationary abutment to cause the outer end of the arm to move oppositely to the direction of movement of the elbow joint. Thus there is a uni-directional output.

In a third embodiment, the throttle linkage comprises an arm pivotally mounted at a point intermediate its outer end and root end. The output member from a servo device has a pair of diametrically opposed, radially spaced actuating fingers to engage the linkage arm. Rotation of the servo output in either direction causes one or the other of the actuating fingers to rotate the linkage arm in the same direction to move the throttle to its lower speed setting.

In a fourth embodiment, there is a linkage arrangement similar to the third embodiment, except that the main linkage arm is connected to the servo output by an intermediate arm. Otherwise, the operation of the fourth embodiment is similar to that of the third embodiment.

In a fifth embodiment, there are two linkage arms connected from the servo output to a bellcrank which in turn actuates the throttle lever. Movement of the servo output in either a clockwise or a counterclockwise direction moves the bellcrank in the same direction to move the throttle lever to its lower speed setting.

In a sixth embodiment, there is a straight arm link pivotally mounted at an intermediate point similar to the arrangement in the third and fourth embodiments. A cam finger is mounted to the servo output, and rotation of the cam member in either a clockwise or counterclockwise direction moves the arm in the same direction to move the throttle lever to a lower speed position.

BRIEF DESCRIPTION OF THE DRAWINGS

FIGS. 14 through 16 are semi-schematic drawings similar to FIGS. 2 through 4 showing a fifth embodiment of the present invention; and FIGS. 17 through 19 are similar to FIGS. 2 through 4 and show a sixth embodiment of the present invention.

DESCRIPTION OF THE PREFERRED EMBODIMENTS

The present invention is described herein as incorporated in a model automobile. However, it is to be understood that it can also be incorporated in a model boat, in which case the steering actuating rod could simply be connected to the tiller of the boat to operate the rudder, instead of connected to the front car wheels as shown herein. Thus the term, "vehicle," as used herein is intended to include model boats as well as model cars.

Figure 1:
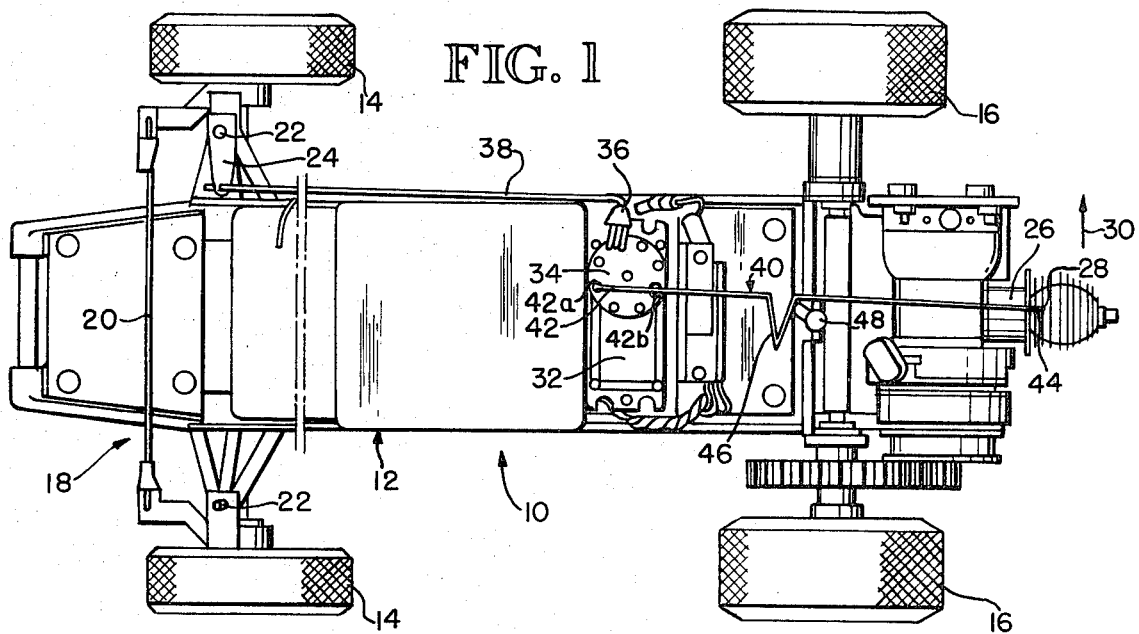
FIG. 1 is a bottom view of a model car embodying the present invention.

In FIG. 1 is illustrated a remotely controlled vehicle 10, (i.e., a model car), comprising a frame 12, front steering wheels 14, and rear drive wheels 16. The steering mechanism 18 for the front wheels 14 is conventional, and comprises a tie rod 20 interconnecting the wheels which are mounted to king pins 22. An actuating arm 24 is rigidly connected to one of the wheels 14 to initiate turning the wheels 14 to the right or to the left.

At the rear of the car 10 there is a small internal combustion motor 26 having a throttle control lever 28. As shown in FIG. 1, the lever 28 is in its open or high speed position. The throttle lever 28 is moved to its low speed position by moving it in the direction indicated by the arrow 30 (upwardly with respect to orientation of FIG. 1).

At the approximate center of the car is a remotely controlled servo mechanism 32, which functions in a conventional manner to receive remotely initiated radio signals to rotate its output place 34 in either a clockwise or counterclockwise direction. At the periphery of the plate 34 is connected on end 36 of a steering actuating rod 38, the other end of which is attached to the aforementioned steering arm 24. Movement of the output disc 34 clockwise turns the wheels 14 in one direction, while movement in a counterclockwise direction turns the wheels 14 in the opposite direction.

Interconnecting the output plate 34 of the servo mechanism 32 with the throttle lever 28 of the motor 26 is an "elbow linkage," generally designated 40. This elbow linkage 40 is an arm made of resilient metal wire which flexes under moderate pressure. This arm has a root end 42 which is rigidly connected to the servo output plate 34 at 42a and 42b, and an outer end 44 connected to the throttle 28. An intermediate portion of the arm 40 is formed as an elbow portion 46 about which the arm 40 bends. In the particular arrangement shown herein, this is conveniently accomplished by making a general right-angled crimp 46 in the arm 40 to provide greater flexibility at the location of the elbow. Positioned adjacent the arm 40 at a location between the elbow 46 and outer end 44 is a stationary abutment 48 connected to the car frame 12.

Figure 2:
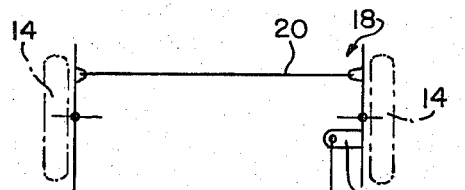
FIGS. 2 through 4 are schematic drawings of the car of FIG. 1 in plan view, illustrating the operation of the control apparatus of the present invention.
Figure 2:
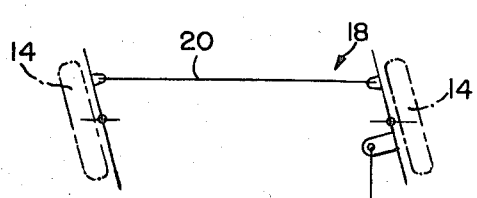
Figure 2:
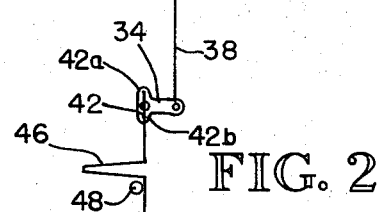

The operation of this first embodiment of invention can best be described with reference to FIGS. 2 through 4, which are semi-schematic bottom plan views of the car shown in FIG. 1. IN FIG. 2, the output plate 34 of the servo mechanism 32 is in its intermediate position, wherein the steering apparatus 18 is maintaining the front wheels 14 in the straight ahead position. With the servo output plate 34 in its intermediate position, the arm 40 extends in a straight line rearwardly to the throttle lever 28, which is in its high speed position. With the arm 40 in this location, it is adjacent the abutment 48.

Figure 3:
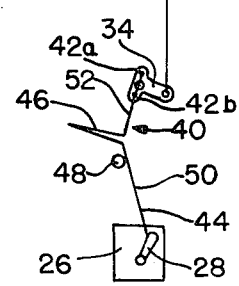

With reference to FIG. 3, when the output plate 34 is turned clockwise (as seen in FIG. 3) to turn the steering mechanism 18 to the left, the arm 40 is rotated so as to bear against the abutment 48. With the inner end of the outer arm portion 50 pressing against the abutment 48, the arm 40 will bend about its elbow 46 so as to cause the lower arm portion 50 to rotate oppositely to the upper arm portion 52. The effect is to cause the outer end 44 of the arm 40 to move to the right (as seen in FIG. 3) and move the throttle lever 38 to the right (which is its lower speed setting). Movement of the output plate 34 back to its intermediate position to move the steering mechanism 18 back to its straight ahead position causes the arm 40 to return to the position of FIG. 2, in which condition the arm 40 springs back to the position of FIG. 2 to move the throttle back to its high speed position.

Figure 4:
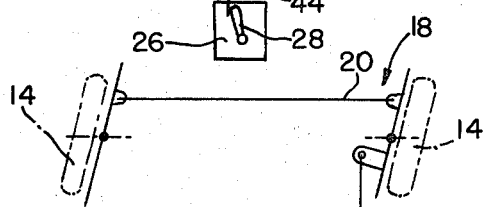
Figure 4:
Figure 4:
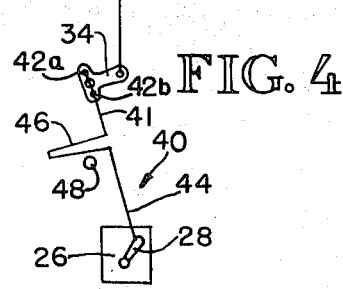

When the output plate 34 is moved in the opposite direction (i.e., counterclockwise, as seen in FIG. 4) to move the steering mechanism 18 to the right, the arm 40 is moved away from the abutment 48 in a counterclockwise direction. While there is a moderate flexing of the arm 40 due to moderate resistance of the throttle lever 28, there is a substantial straight arm movement of the arm 40 to move the throttle lever 28 to its lower speed setting. Thus, regardless of which way the steering mechanism 18 is turned from the straight ahead position, the throttle lever 28 is moved to its low speed position, and back to its high speed position when the steering mechanism is turned back to its straight ahead position.

Since the arm 40 is made of a resilient material, it is possible to arrange the components so that with the steering mechanism 18 moved only to a partially turned position, the throttle 28 is moved to its full low throttle position, and by then turning the steering mechanism 18 still further to its full turn position, the override is taken up in the flexing of the arm 40. Thus, when the car is traveling at high speed in the straight ahead condition, the operator can signal a partial turn to slow the car 10 down, after which the car can then be placed into a full turn without overturning or spinning out. Then when the car is coming out of the turn, acceleration does not begin until the steering mechanism has moved partially toward its straight ahead position at which the arm 40 begins to bring the throttle 28 back to its high speed setting.

In describing embodiments two through six, those components of the further embodiments similar to corresponding components of the first embodiment will be given like numerical designations, with a letter suffix distinguishing those components of the further embodiments. Thus, corresponding components of the second embodiment will be given an *a* suffix, those of the third embodiment a *b* suffix, and so on, with the corresponding components of the sixth embodiment being given an *e* suffix.

Figure 5:
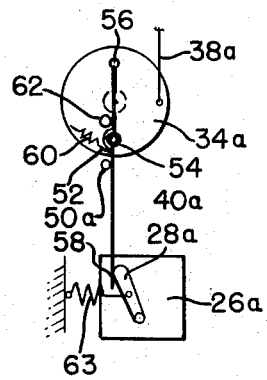
FIGS. 5 through 7 are schematic drawings similar to FIGS. 2 through 4, showing a second embodiment of the present invention.
Figure 6:
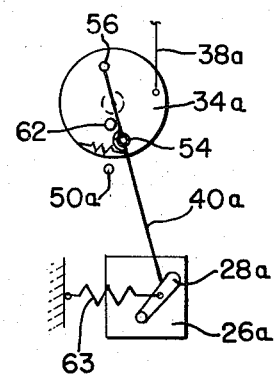
Figure 7:
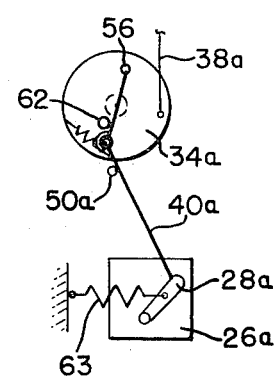

The second embodiment is illustrated in FIGS. 5 through 7. There is a motor 26a having a throttle 28a, which is movable to the right to a lower speed setting. There is a servo output member 34a having a steering actuating rod 38a which functions similar to the rod 38 of the first embodiment to turn the steering wheels to the right or the left. There is a modified elbow linkage 40a having a pivotal elbow joint 52, having a stop mechanism 54 which permits the arm 40a to pivot only in one direction. The root end 56 of the arm 40a is connected to the forward end of the output member 34a, and the outer end 58 of the arm 40a is connected to the throttle 28a.

As shown in FIG. 6, when the output member 34a is rotated counterclockwise (as viewed in FIG. 6), the arm 40a moves in straight arm fashion to move the throttle 28a to the right to its lower speed setting. When the servo output member 34a is moved in the opposite direction, the arm 40a bears against the abutment 48 to cause it to flex about the elbow joint 52 so that the outer end 58 of the arm 40a again moves the throttle 28a to its lower setting. A tension spring 60 pulls the pivot 52 to cause the flexure, while a pin 62 mounted to the servo output at a location adjacent the pivot 52, causes the arm 40a to move in straight arm fashion as in FIG. 6. A tension spring 63 urges the throttle 28a to its high speed setting.

Figure 8:
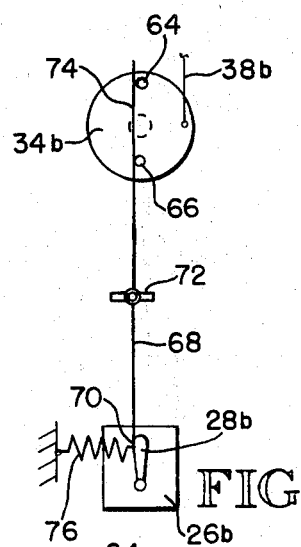
FIGS. 8 through 10 are schematic drawings similar to FIGS. 2 through 4 showing a third embodiment of the present invention.
Figure 9:
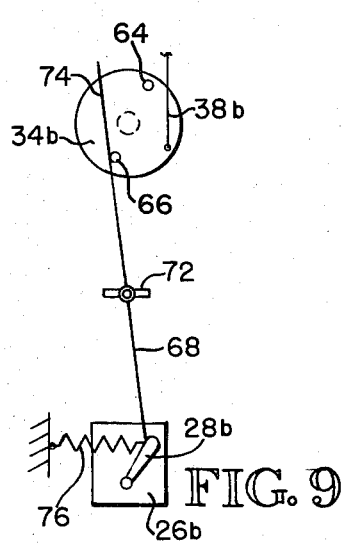
Figure 10:
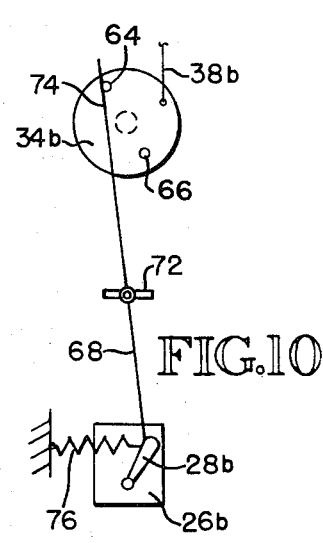

The third embodiment is illustrated in FIGS. 8 through 10. The servo output 34b has two radially spaced diametrically opposed actuating fingers, a forward finger 64 and a rear finger 66. There is a straight control rod 68 connected at its rear end 70 to the throttle 28b. At approximately its midpoint, the rod 68 is pivotally and slidably mounted to the automobile structure at 72. The forward end 74 of the rod 68 bears against the two actuating fingers 64 and 66 when the servo output 34b is in its intermediate position. A tension spring 76 connected to the automobile structure urges the throttle 28b to its high speed position.

As shown in FIG. 9, when the servo output 34b moves clockwise, the rear finger 66 causes the rod 68 to rotate counterclockwise and move the throttle 28b to its low speed position. As shown in FIG. 10, when the servo output 34b moves in the opposite direction, the forward finger 64 engages the rod 68 so that the throttle 28b is moved to its low speed position.

Figure 11:
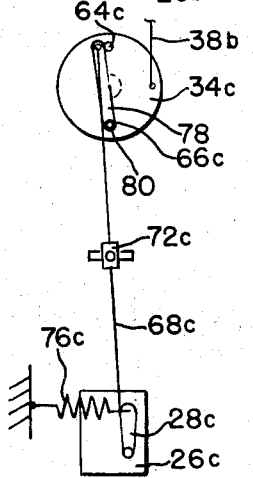
FIGS. 11 through 13 are semi-schematic drawings similar to those in FIGS. 2 through 4 showing a fourth embodiment of the present invention.
Figure 12:
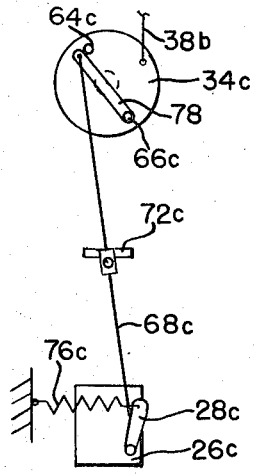
Figure 13:
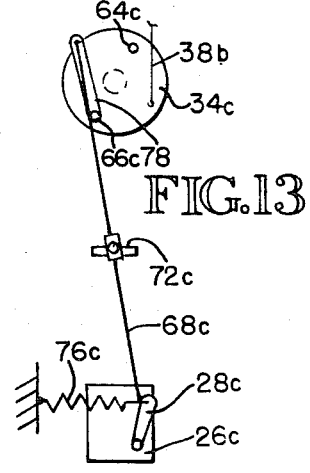

The fourth embodiment is shown in FIGS. 11 through 13. This fourth embodiment is substantially the same as the third embodiment, except that the rod 68c is connected at its forward end to an intermediate arm 78, which in turn is pivotally mounted at a point 80 at the rear of the servo output 34c. As shown in FIG. 12, when the servo output 34c is rotated counterclockwise, a forward actuating finger 64c engages the intermediate arm 78 to rotate the rod 68c counterclockwise. As shown in FIG. 13, when the servo output 34c is rotated in the opposite direction, an actuating finger 66c at the pivot location 80 of the arm 78 engages the rod 68c to again rotate it counterclockwise and move the throttle 28c to its low speed position.

The fifth embodiment as shown in FIGS. 14 through 16. There are two actuating rods 90 and 92, the forward ends 94 and 96, respectively, of which are pivotally mounted to the servo output 34c on opposite sides of the center of rotation 98 of the servo output 34c. The rear ends 100 and 102 of, respectively, the rods 90 and 92 are mounted in respective slots 104 and 106 in a bellcrank 108. The bellcrank is pivotally mounted at 110 to the car structure, and has an output arm 112 which engages the throttle 28d.

As viewed in FIG. 14, the pivot point 96 of the rod 92 is positioned to the right of the servo output rotational center 98, while the forward end 94 of the rod 90 is positioned to the left of the servo center of rotation 98. Thus, as seen in FIG. 15, when the servo output 34d is moved clockwise, the left-hand rod 90 pulls the bellcrank 108 counterclockwise to move the throttle 28d to its low speed position. As seen in FIG. 16, when the servo output 34d moves in the opposite direction, the right-hand rod 92 pulls the bellcrank 108 counterclockwise also to move the throttle 28d to its low speed position.

The sixth embodiment is shown in FIGS. 17 through 19. In this embodiment, there is a rod 68e similar to the rod 68 of the third embodiment shown in FIGS. 8 through 10. However, in the sixth embodiment, there is a cam finger 120 fixedly mounted to the servo output 34e and engaging the arm 68e. A tension spring 122 urges the throttle 28e to its low speed position. Rotation of the servo output 34e in either direction from its intermediate position causes movement of the throttle 28e to its low speed position.

What is claimed is:

1. In combination with a remotely operated vehicle comprising a steering mechanism having a straight ahead position, a first turning position in one direction and a second turning position in the other direction, and having a motor with a throttle to control the speed of the motor, the improvement comprising a steering and throttle control apparatus, comprising:

a. a servo device mounted to said vehicle and movable by command inputs between a first intermediate position and a second operating position, and between said first intermediate position and a third operating position, b. steering actuating means operatively connected between said servo device and said steering mechanism in a manner that with said servo device in its intermediate position, said steering mechanism is in its straight ahead position, with said servo device in its second operating condition said steering apparatus is in its first turning position, and with said servo device in its third operating condition said steering apparatus is in its second turning position, c. throttle actuating means operatively connected between said servo device and said throttle move said throttle in a manner that with said servo in its intermediate position, said throttle is at a higher setting to cause said vehicle to travel at a higher speed and with said servo device being moved to either its first or second position, said throttle is moved to a lower setting to cause said vehicle to travel at a lower speed, whereby when said vehicle is traveling a straight course, it is traveling at a higher speed and with a command input to cause said vehicle to turn in either direction, said vehicle is traveling at a lower speed.

2. The apparatus as recited in claim 1, wherein said servo device has a bi-directional movement from its intermediate position with movement in one direction to move to its third position, and said throttle actuating means is linkage means characterized in that it translates a bidirectional input from the servo device into a uni-directional output, whereby with said servo device moving in either its one or other direction, said throttle is moved in a single direction.

3. The apparatus as recited in claim 2, wherein said throttle actuating means is further characterized in having an actuating override whereby when said servo device has moved to an extent that said throttle has moved to its furthest lower setting, said servo device is able to move further so as to cause further movement of said steering apparatus.

4. The apparatus as recited in claim 3, wherein said throttle actuating means comprises flexible means which yields in a manner to permit override movement of said servo device to a position beyond that where said servo device has moved said throttle to its furthest lower setting.

5. The apparatus as recited in claim 1, wherein said second actuating means comprises an elbow linkage comprising an arm having a root end operatively connected to said servo device so as to be movable in both a first direction and a second direction and an outer end connected to said throttle, said arm having an elbow portion intermediate its root end and outer end about which the arm is able to bend, and means to engage said arm so that movement of said servo device in one direction causes the arm to bend at the elbow to move the end of the arm in the opposite direction, whereas movement of the servo mechanism in a second direction permits said arm to move in substantial straight arm fashion so that the end of the arm moves in the same direction as the servo mechanism.

6. The apparatus as recited in claim 5, wherein said elbow linkage comprises a resilient arm and said elbow portion is an angular bendable portion of the arm intermediate its root end and outer end.

7. The apparatus as recited in claim 5, wherein said elbow linkage comprises an arm having an elbow pivot point, and said arm being arranged to articulate about said elbow joint.

8. The apparatus as recited in claim 5, wherein said means to bend said arm comprises an abutment located on one side of said arm at a location between the elbow of the arm and the outer end of the arm.

9. The apparatus as recited in claim 5, wherein said elbow linkage comprises a resilient elongate wire.

10. THe apparatus as recited in claim 8, wherein said wire is formed with a crimp to provide increased flexibility at the area of the crimp.

11. The apparatus as recited in claim 1, wherein said throttle actuating means comprises arm means pivotally mounted to said vehicle at a pivot location on the vehicle, said arm means being operatively connected to said throttle at a location spaced from the pivot point in a manner that pivot motion of the arm means moves said throttle between its higher setting and its lower setting, and arm actuating means operatively connected to said servo device and operatively engaging said arm means in a manner that movement of the servo device to either its second or third position causes movement of the arm means to move the throttle to its lower setting.

12. THe apparatus as recited in claim 11, wherein the arm actuating means comprises two finger means to engage the arm means, said servo device having a rotatable member on which said two finger means are mounted in angularly spaced relationship with respect to a point of rotation of the servo rotatable member, whereby rotation of said rotatable member in either a clockwise or counterclockwise direction causes the arm means to pivot in a predetermined direction to cause said throttle to move to its lower setting.

13. The apparatus as recited in claim 12, wherein said pivot point is operatively positioned intermediate said servo rotatable member and said throttle.

14. The apparatus as recited in claim 12, wherein said two finger means are mounted in generally diametrically opposed relationship with respect to the point of rotation of said servo rotatable member.

15. The apparatus as recited in claim 12, wherein said arm means is connected at one end to a second arm which is in turn connected to said servo rotatable member and movable therewith.

16. The apparatus as recited in claim 11, wherein said servo device has a rotatable actuating member, cam means operatively connected between said rotatable actuating member and said arm, said cam means being arranged to move said arm pivotally in the same direction with both clockwise and counterclockwise rotation of said actuating member from a predetermined location.

17. The apparatus as recited in claim 1, wherein said servo device has a rotatable actuating member, two actuating rod means having first ends connected to the rotatable actuating member at angularly spaced locations with respect to a center of rotation of said rotatable actuating member, said two connecting rod means having respective second ends operatively connected to said throttle in a manner that rotation of said rotatable actuating member in either a clockwise or counterclockwise direction from a predetermined location causes one or the other of said rod means to move said throttle to its lower speed setting.

18. The apparatus as recited in claim 17, wherein there is bellcrank means operatively connected to said throttle, and both of said rod means are operatively connected to said bellcrank means to move said throttle.

19. The apparatus as recited in claim 1, wherein said throttle actuating means comprises cam means operatively connected to said servo device in a manner that said cam means has a first intermediate position, a second operating condition, and a third operating condition, corresponding to, respectively, the first, second and third operating positions of the servo device, and said cam means also being operatively connected to said throttle in manner that in its first position, it causes the throttle to be at its high setting, and in its second or third operating condition it causes said throttle to be at its lower setting.

* * * * *